Sept. 23, 1969            A. H. LAMB            3,468,515
VEHICULAR SAFETY GUARD
Filed Feb. 15, 1968
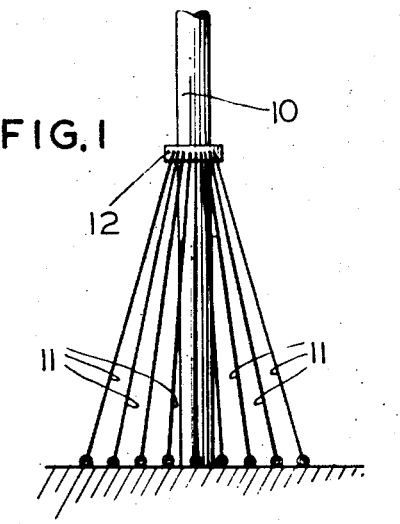
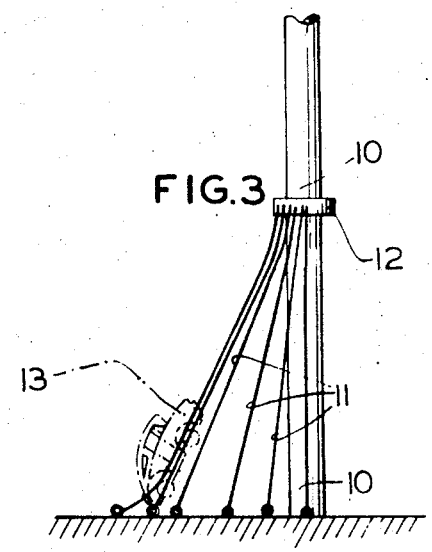
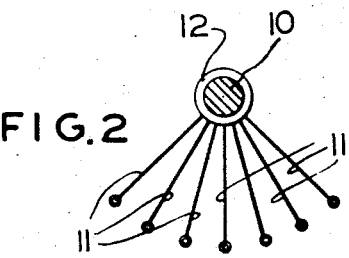
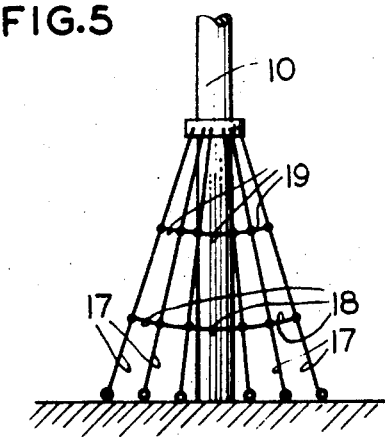
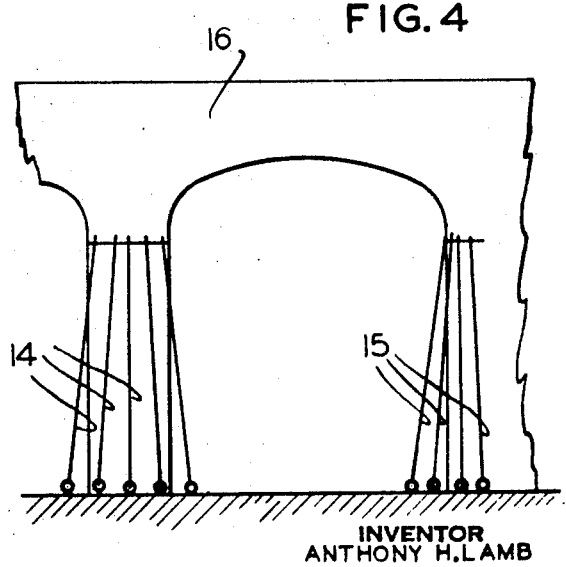
INVENTOR
ANTHONY H. LAMB
BY *Rudolph J. Lurich*
ATTORNEY United States Patent Office 3,468,515
Patented Sept. 23, 1969

3,468,515
VEHICULAR SAFETY GUARD
Anthony H. Lamb, 66 King St., Hillside, N.J. 07205
Filed Feb. 15, 1968, Ser. No. 705,705
Int. Cl. E04h 17/10; E01f 15/00
U.S. Cl. 256—1                                                2 Claims

ABSTRACT OF THE DISCLOSURE

One or more steel cables forming a safety guard for an immovable object located in a position where it is likely to be struck by a vehicle traveling on a highway, the cables being arranged to absorb the impact force of the vehicle.

Background of the invention

Most single vehicle fatalities, occurring particularly on highways, are due to the colliding of the vehicle with a relatively immovable object, such as a tunnel entrance, bridge abutment, pole, sign support, tower base, toll booth, road divider, the end post of a fence, tree, mountain cliff, etc. When such objects are man made and disposed in positions where they are likely to be struck by a vehicle, they are designed to withstand direct onslaught by a car or truck. However, when such object is struck by a vehicle, particularly at a relatively high speed, the force at impact is tremendous, resulting in serious, and often fatal, injury to the vehicle occupants.

In accordance with this invention, one or more steel cables are installed about an immovable object likely to be struck by a vehicle traveling at a high speed, such cable or cables, serving to decelerate the vehicle at a rate such as to minimize the possibility of serious injury to the occupants and the complete destruction of the vehicle.

Summary of the invention

One or more steel cables have upper ends secured to the object to be protected from direct impact by a vehicle and lower ends secured in fixed position at ground level and at points spaced from the object. When a plurality of cables are utilized, they are arranged to converge upwardly, thereby forming a strong, resilient net for absorbing the impact force of a vehicle. Depending upon the location and form of the particular object, the net encircles the object to the extent necessary to prevent direct contact of a vehicle with the object. Upon impact, the net functions as at snubber to bring the vehicle to a stop under conditions far less likely to cause serious injury to the occupants than is the case when the vehicle rams directly into the object.

An object of this invention is the provision of an arrangement to prevent direct impact of a vehicle with an immovable object located in a position where it is likely to be struck by a vehicle traveling at a relatively high speed.

An object of this invention is the provision of a resilient net formed of steel cables and disposed about an immovable object likely to be struck by a vehicle, which net is constructed and arranged to provide a snubber action to decelerate the vehicle at a rate which reduces the possibility of serious injury to the vehicle occupants.

An object of this invention is the provision of a safety guard for an immovable object located in a position where it may be struck by a vehicle traveling at a relatively high speed, which guard comprises a plurality of converging steel cables, the lower ends of the cables being spaced laterally from the object and secured in fixed position at ground level, and the upper ends of the cables being secured to the object at points well above ground level.

The above-stated and other objects and advantages of the invention will become apparent from the following description when taken with the accompanying drawings. It will be understood, however, that the drawings are for purposes of illustration and are not to be construed as defining the scope or limits of the invention, reference being had for the latter purpose to the claims appended hereto.

Brief description of the drawings

In the drawings wherein like reference characters denote like parts in the several views;

FIGURE 1 is a front elevational view showing a safety guard attached to a pole in accordance with this invention;

FIGURE 2 is a corresponding top plan view thereof;

FIGURE 3 is a corresponding side elevational view thereof;

FIGURE 4 is a fragmentary, front elevational view showing the safety guard applied to bridge abutments; and FIGURE 5 is similar to FIGURE 1 and showing a safety guard made in accordance with another embodiment of the invention.

Description of preferred embodiments

Referring to FIGURES 1–3, there is shown a pole 10 representing an immovable object located in a position where it may be struck directly by a vehicle. A plurality of steel cables 11 have their lower ends spaced laterally from the pole and securely anchored to the ground by any suitable means. At ground level, the cables are spaced apart a distance somewhat less than the width of a conventional automobile. The cables converge, upwardly, and have upper ends secured to the pole at points well above ground level. Desirably, the upper ends of the cables may be secured to a steel band 12, which band is bolted to the pole. As shown in the drawings, the cables form a resilient guard which partially encircles the pole. In this particular case, the pole is assumed to be located on one side of a highway and the guard encircles the pole to an extent necessary to safeguard vehicles traveling in a given direction. On the other hand, in the case wherein the pole is located in a position where it can be struck by vehicles traveling in one or the other direction, the guard will completely encircle the pole. In any case, the guard prevents direct impact between a vehicle and the pole. Upon striking the guard, the vehicle is brought to a stop by the combined action of gravity as the vehicle tends to climb the cables and by a lateral snubbing action as the cables pinch the wheels and/or body from the sides, thereby reducing, considerably, the chance of serious injury to the occupants. At the worst, a vehicle 13 first climbs and then slides back along the cables, or it may roll over on its side, all, however, at non-killing speeds.

FIGURE 4 shows two sets of cables 14 and 15, each set anchored between the ground and the abutments of a bridge 16 and each set forming a resilient safety guard facing the direction of normal traffic flow.

A modification of the safety guard is shown in FIGURE 5, wherein the converging steel cables 17, anchored between the ground and the pole 10, are connected together by the cross cables 18 and 19 to form a net. Such net construction will bring heavier loads to a relatively safe, slow stop by three actions, namely, the gravity effect as the vehicle tends to climb the cables, the lateral snubbing action as the cables pinch the vehicle wheels and/or body from the sides, and the stretching of the cross cables as the vehicle tends to spread the cables apart. For the latter action, the cross cables advantageously can be made of steel or a durable, stretchable material such as rubber or a suitable plastic.

It will be apparent that the cables may be solid or stranded and the number of cables used to form a guard may be varied depending upon the desired load factor and braking action. Preferably, the cables are painted with a light-reflecting paint. Also, the cables may be covered by vines or hidden behind suitable shrubs.

I claim:
1. A safety guard for an immovable object located in a position where it may be struck from a given direction by a vehicle traveling at a relatively high speed, which guard comprises a plurality of spaced, upwardly converging cables, the lower ends of said cables being anchored to the ground at points substantially equally spaced from the object, with the anchored ends of adjacent cables being spaced laterally from each other a distance less than the spacing between the front wheels of the vehicle, the upper ends of the cables being secured to the object at points above the top of the vehicle; the recited arrangement being such that a vehicle approaching the object in the given direction will be intercepted by the lower portions of the cables, the vehicle being brought to a stop by the combined action of gravity as the vehicle tends to climb the cables and by the lateral snubbing action as the cables pinch the front wheels and sides of the vehicle.

2. The invention as recited in claim 1, including at least one cross cable connected to each of the said converging cables at points intermediate of the cable ends.

References Cited

UNITED STATES PATENTS

| | | | |
|---|---|---|---|
| 1,814,664 | 7/1931 | Cahill et al. | 256—1 |
| 1,926,131 | 9/1933 | Wilde | 256—1 X |
| 2,005,418 | 6/1935 | Gleason et al. | 256—13.1 |
| 2,008,794 | 7/1935 | Obbard | 256—13.1 X |
| 2,088,087 | 7/1937 | Hudson | 256—1 |
| 2,121,379 | 6/1938 | Young | 256—1 X |
| 3,141,655 | 7/1964 | Platt | 256—1 X |

FOREIGN PATENTS

| | | |
|---|---|---|
| 1,012,212 | 12/1965 | Great Britain. |
| 146,573 | 7/1936 | Austria. |

DENNIS L. TAYLOR, Primary Examiner

U.S. Cl. X.R.

256—13.1